(12) United States Patent
Kajiyama et al.

(10) Patent No.: US 11,770,481 B2
(45) Date of Patent: Sep. 26, 2023

(54) INFORMATION PROCESSING APPARATUS, CONTROL METHOD, AND INFORMATION PROCESSING SYSTEM

(71) Applicant: Canon Kabushiki Kaisha, Tokyo (JP)

(72) Inventors: Takahiro Kajiyama, Kanagawa (JP); Kazunari Shishido, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/880,846

(22) Filed: Aug. 4, 2022

(65) Prior Publication Data

US 2022/0377184 A1    Nov. 24, 2022

Related U.S. Application Data

(63) Continuation of application No. 17/217,151, filed on Mar. 30, 2021, now Pat. No. 11,445,073.

(30) Foreign Application Priority Data

Mar. 30, 2020   (JP) .................................. 2020-061430

(51) Int. Cl.
*H04N 1/00* (2006.01)
(52) U.S. Cl.
CPC ....... *H04N 1/00244* (2013.01); *H04N 1/0097* (2013.01); *H04N 1/00925* (2013.01); *H04N 2201/0094* (2013.01)
(58) Field of Classification Search
None
See application file for complete search history.

(56) References Cited

U.S. PATENT DOCUMENTS

| | | | |
|---|---|---|---|
| 2019/0104173 A1 | 4/2019 | Yamazaki | |
| 2019/0251407 A1 | 8/2019 | Watanabe | |
| 2020/0152201 A1* | 5/2020 | Chang | H04N 1/0035 |
| 2020/0175979 A1* | 6/2020 | Lee | G06F 3/0482 |
| 2020/0285437 A1* | 9/2020 | Mori | G06F 3/1203 |

FOREIGN PATENT DOCUMENTS

JP    2017047590 A    3/2017

* cited by examiner

*Primary Examiner* — Frantz Bataille
(74) *Attorney, Agent, or Firm* — Venable LLP

(57) ABSTRACT

The present invention provides an information processing apparatus capable of performing appropriate processing wider a predetermined usage agreement. To this end, the information processing apparatus stores state information indicating whether the information processing apparatus is in a first state in which a predetermined service is unavailable or a second state in which the predetermined service is available. Moreover, the information processing apparatus communicates with a server and updates the stored state information based on the predetermined agreement information obtained from the server. In the case where the stored state information indicates the second state at a timing at which the information processing apparatus is reactivated or recovers from a power-saving mode, the information processing apparatus performs the processing of communicating with the server and updating the state information and the preparation processing for starting predetermined processing according to a received job in parallel.

11 Claims, 9 Drawing Sheets

| AGREEMENT STATE / TANK TYPE | FIRST STATE | SECOND STATE |
|---|---|---|
| GENERAL TANK | USABLE | USABLE |
| SERVICE TARGET TANK | UNUSABLE | USABLE |

FIG.7A

| AGREEMENT STATE / TANK TYPE | FIRST STATE | SECOND STATE |
|---|---|---|
| GENERAL TANK | USABLE | UNUSABLE |
| SERVICE TARGET TANK | UNUSABLE | USABLE |

FIG.7B

INFORMATION PROCESSING APPARATUS, CONTROL METHOD, AND INFORMATION PROCESSING SYSTEM

BACKGROUND OF THE INVENTION

Field of the Invention

The present invention relates to an information processing apparatus that can receive a service based on an agreement, a control method of the same, and an information processing system.

Description of the Related Art

There is known a method of managing a usage agreement of an information processing apparatus with a management server capable of communicating with the information processing apparatus. Japanese Patent Laid-Open No. 2017-47590 discloses an image printing apparatus that restricts processing under a specific usage agreement if a state where the image printing apparatus performs no communication with a server continues for a predetermined period.

SUMMARY OF THE INVENTION

The information processing apparatus is sometimes turned off or enter a power-saving mode with the specific usage agreement left in a concluded state. In this case, in the configuration of Japanese Patent Laid-Open No. 2017-47590, in restarting of the information processing apparatus or recovery thereof from the power-saving mode, the information processing apparatus needs to communicate with the server to reset or recheck agreement information and the user sometimes has to wait for a long period before desired processing under the specific usage agreement is started.

The present invention has been made to solve the aforementioned problem and an object thereof is to provide a technique that allows an appropriate operation under a specific usage agreement.

In a first aspect of the present invention, there is provided

In a second aspect of the present invention, there is provided

In a third aspect of the present invention, there is provided

Further features of the present invention will become apparent from the following description of exemplary embodiments with reference to the attached drawings.

BRIEF DESCRIPTION OF THE DRAWINGS

FIGS. 7A and 7B are diagrams illustrating a usable/unusable state depending on an agreement state and the type of the main tank;

DESCRIPTION OF THE EMBODIMENTS

<Schematic Configuration of Printing Apparatus>

Figure 1:
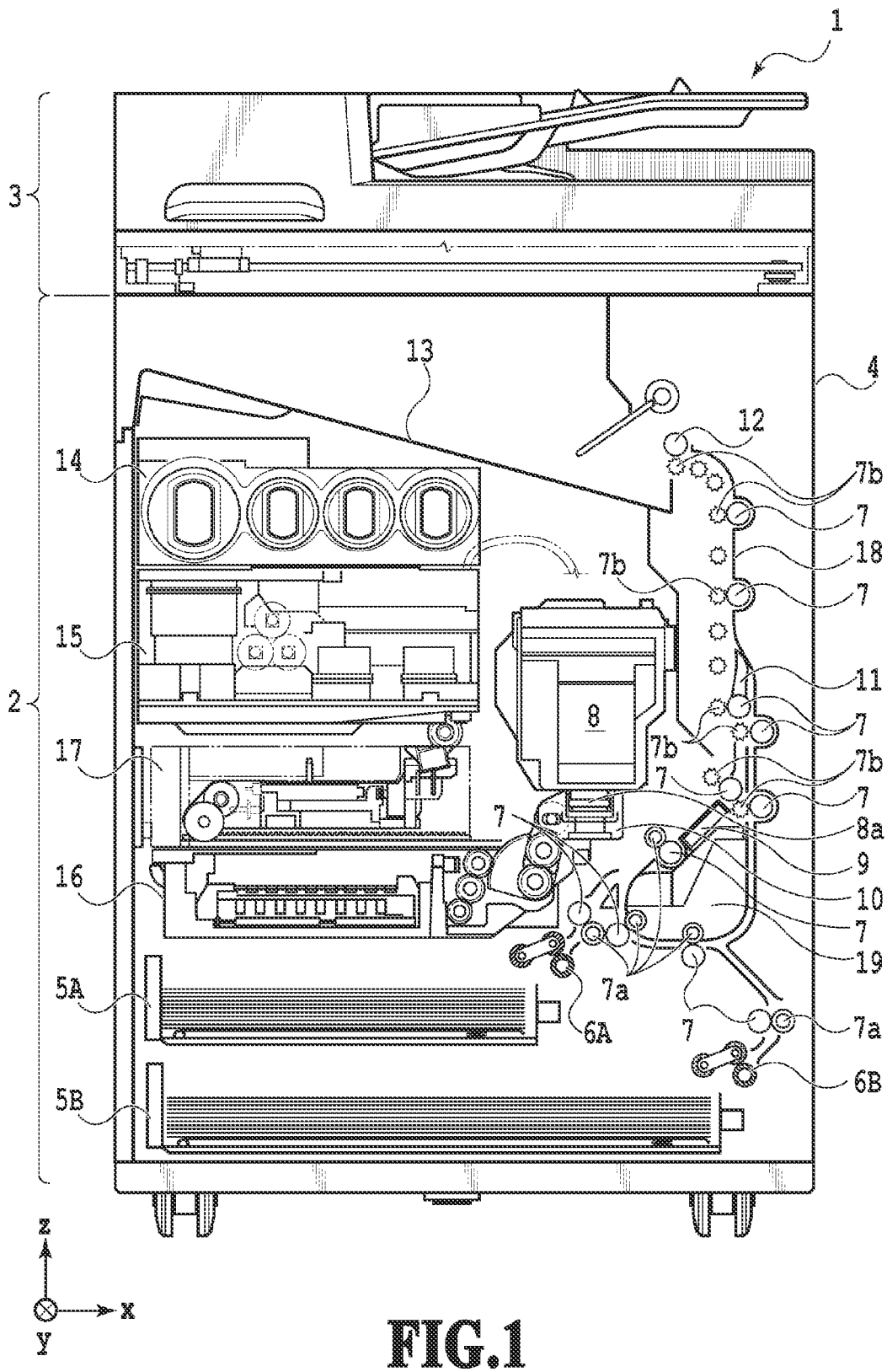
FIG. 1 is an internal configuration diagram of an ink-jet printing apparatus.

FIG. 1 is an internal configuration diagram of an ink-jet printing apparatus 1 (hereinafter, printing apparatus 1) usable as an information processing apparatus of the present invention. In FIG. 1, an x direction is a horizontal direction, a y direction (sheet surface perpendicular direction) is a direction in which ejection ports are aligned in a print head 8, and a z direction is a vertical direction.

The printing apparatus 1 is a multi-function peripheral including a print unit 2 and a scanner unit 3 and the print unit 2 and the scanner unit 3 can execute various processes relating to a printing operation and a reading operation individually or in cooperation. The scanner unit 3 includes an automatic document feeder (ADF) and a flatbed scanner (FBS) and can read originals automatically fed by the ADF and read (scan) an original placed on a document table of the FBS by a user. Although the embodiment is the multi-function peripheral including both of the print unit 2 and the scanner unit 3, a mode including no scanner unit 3 may be employed. FIG. 1 illustrates a standby state where the printing apparatus 1 is performing neither the printing operation nor the reading operation.

A first cassette 5A and a second cassette 5B that contain print media (cut sheets) S are detachably installed in a bottom portion of the print unit 2 on the lower side in the vertical direction. Relatively small print media up to a size of A4 are contained in the first cassette 5A while being stacked one on top of another and relatively large print media up to a size of A3 are contained in the second cassette 5B while being stacked one on top of another. A first feeding unit 6A that separates the contained print media S from one another and feeds the print media S one by one is provided near the first cassette 5A. Similarly, a second feeding unit 6B is provided near the second cassette 5B. In a case where the printing operation is performed, the print media S are selectively fed from one of the cassettes.

Conveyance rollers 7, a discharge roller 12, pinch rollers 7a, spurs 7b, a guide 18, an inner guide 19, and a flapper 11 are a conveyance mechanism that guides the print media S in a predetermined direction. The conveyance rollers 7 are arranged upstream and downstream of the print head 8 and are drive rollers driven by a not-illustrated conveyance motor. The discharge roller 12 is arranged just before a discharging port and is a drive roller driven by the not-illustrated conveyance motor. The pinch rollers 7a are driven rollers that rotate by nipping the print media S before the printing together with the conveyance rollers 7. The spurs 7b rotate by nipping the print media S subjected to the printing together with the conveyance rollers 7 or the discharge roller 12.

The guide 18 is provided in a conveyance path of the print media S and guides the print media S in the predetermined direction. The inner guide 19 has a curved side surface that is a member extending in the y direction, and guides the print media S along this side surface. The flapper 11 is a member that switches the direction in which the print media S are conveyed in a duplex printing operation. A discharge tray 13 is a tray for stacking and holding the print media S for which the printing operation is completed and which are discharged by the discharge roller 12.

The print head 8 of the embodiment is a full-line type color ink-jet print head and multiple ejection ports that eject inks according to print data are aligned in they direction in FIG. 1, corresponding to the width of the print media S. In a case where the print head 8 is at a standby position, an ejection port surface 8a of the print head 8 is capped by a cap unit 10 as illustrated in FIG. 1. In the printing operation, a print controller 202 to be described later changes the orientation of the print head 8 such that the ejection port surface 8a faces a platen 9. The platen 9 is formed of a flat plate extending in the y direction and supports the print medium S subjected to the printing operation by the print head 8, from the back side.

An ink tank unit 14 stores inks of four colors to be supplied to the print head 8. An ink supply unit 15 is provided in the middle of channels connecting the ink tank unit 14 and the print head 8 and adjusts the pressure and flow rate of each ink in the print head 8 to appropriate ranges. In the embodiment, a circulation ink supply system is employed and the ink supply unit 15 adjusts the pressure of each ink supplied to the print head 8 and the flow rate of the ink collected from the print head 8 to the appropriate ranges.

A maintenance unit 16 includes the cap unit 10 and a wiping unit 17 and activates these units at predetermined timing to perform a maintenance operation on the print head 8. The maintenance operation is described in detail later.

Figure 2:
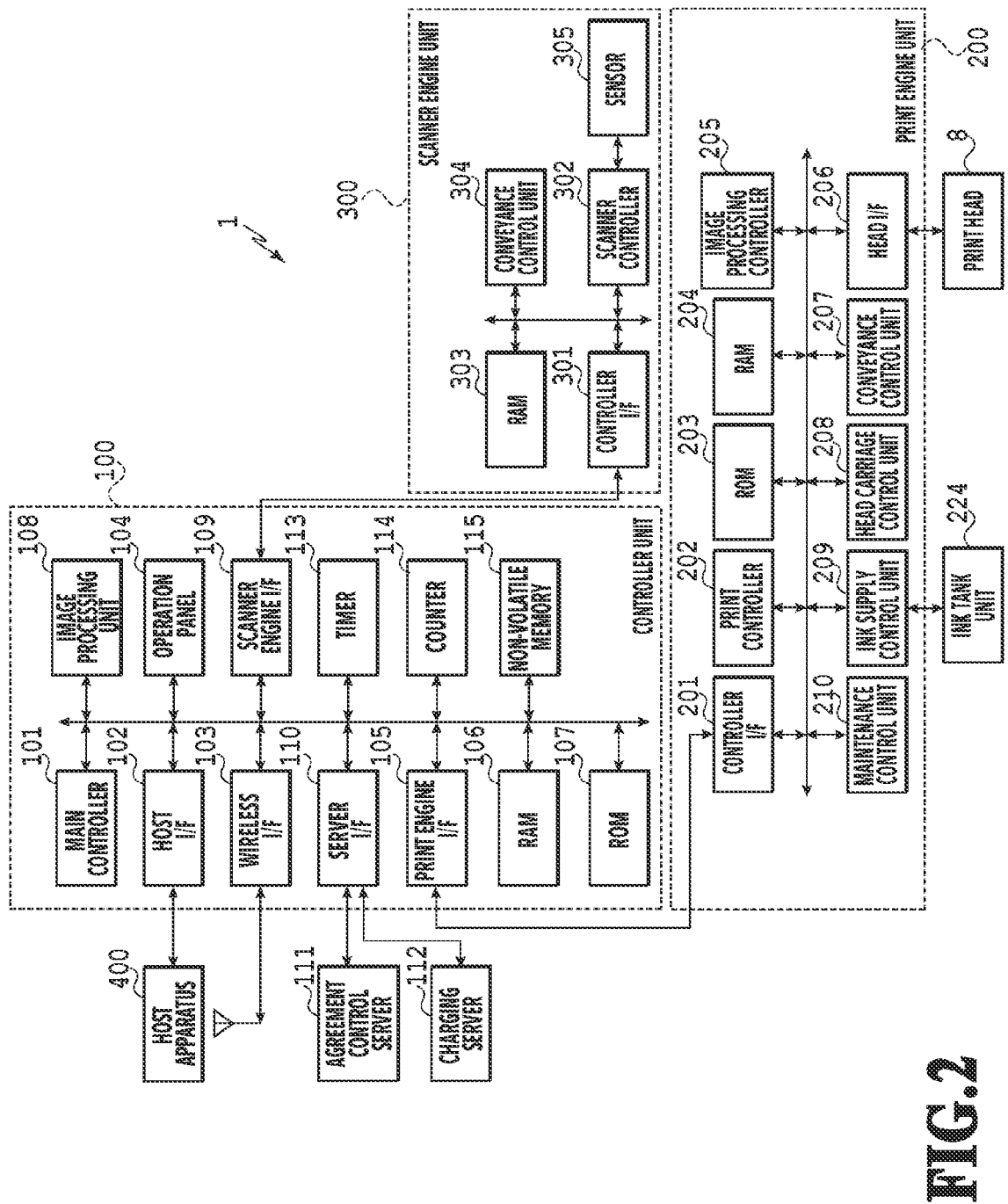
FIG. 2 is a block diagram illustrating a control configuration of the printing apparatus.

FIG. 2 is a block diagram illustrating a control configuration in the printing apparatus 1. The control configuration is formed of a print engine unit 200 that mainly controls the entire print unit 2, a scanner engine unit 300 that controls the entire scanner unit 3, and a controller unit 100 that controls the entire printing apparatus 1. The print controller 202 controls various mechanisms of the print engine unit 200 according to instructions of a main controller 101 in the controller unit 100. The main controller 101 in the controller unit 100 controls various mechanisms of the scanner engine unit 300. Details of the control configuration are described below.

In the controller unit 100, the main controller 101 formed of a central processing unit (CPU) controls the entire printing apparatus 1 according to a program and various parameters stored in a read only memory (ROM) 107 while using a random access memory (RAM) 106 as a work area. For example, in a case where the main controller 101 receives a print job from a host apparatus 400 via a host interface (I/F) 102 or a wireless I/F 103, an image processing unit 108 performs predetermined image processing on the received image data according to an instruction of the main controller 101. Then, the main controller 101 sends the image data subjected to the image processing to the print engine unit 200 via a print engine 105. Moreover, for example, in a case where the main controller 101 receives a read command from the host apparatus 400, the main controller 101 sends this command to the scanner unit 3 via a scanner engine I/F 109.

Note that the printing apparatus 1 may obtain the image data from the host apparatus 400 through wireless communication or wired communication or obtain the image data from an external storage apparatus (USB memory or the like) connected to the printing apparatus 1. Communication methods used in the wireless communication and the wired communication are not limited to certain methods. For example, Wireless Fidelity (Wi-Fi) (registered trademark) and Bluetooth (registered trademark) can be applied as the communication method used in the wireless communication. Moreover, Universal Serial Bus (USB) and the like can be applied as the communication method used in the wired communication.

A server I/F 110 is an interface used to connect the printing apparatus 1 to the Internet. The main controller 101 exchanges information with an agreement control server 111 and a charging server 112 via the server I/F 110.

An operation panel 104 is a mechanism used by the user to perform input and output on the printing apparatus 1. The user can instruct the printing apparatus 1 to perform operations such as copying and scanning, set a print mode, set and update agreement information of the printing apparatus 1 through the operation panel 104.

A timer 113 manages current time. A counter 114 counts the number of images printed by the printing apparatus 1 in each of a color mode and a monochrome mode. Count values obtained by the counter 114, state information of the printing apparatus to be described later, and the like are saved as necessary in a non-volatile memory 115.

In the print engine unit 200, the print controller 202 formed of a CPU controls various mechanisms included in the print unit 2 according to a program and various parameters stored in a ROM 203, under an instruction of the main controller 101. In this case, the print controller 202 uses a RAM 204 as a work area.

For example, in a case where the print controller 202 receives various commands and image data via a controller I/F 201, the print controller 202 saves the various commands and the image data temporarily in the RAM 204. The print controller 202 causes an image processing controller 205 to convert the saved image data to print data and this enables the image data to be used by the print head 8 in the printing operation.

After the generation of the print data, the print controller 202 causes the print head 8 to execute the printing operation based on the print data via a head I/F 206. In this case, the print controller 202 drives the feeding units 6A, 6B, the conveyance rollers 7, the discharge roller 12, and the flapper 11 illustrated in FIG. 1 via a conveyance control unit 207 to convey the print media S. The printing operation by the print head 8 is executed along with the conveyance operation of the print media S according to an instruction of the print controller 202 and the print processing is performed.

A head carriage control unit 208 changes the orientation and position of the print head 8 depending on an operation state such as a maintenance state and a printing state of the printing apparatus 1. An ink supply control unit 209 controls the ink supply unit 15 such that the pressure of the ink supplied to the print head 8 is within an appropriate range. A maintenance control unit 210 controls operations of the cap unit 10 and the wiping unit 17 in the maintenance unit 16 in a case where the maintenance operation is performed on the print head 8.

In the scanner engine unit 300, the main controller 101 controls a hardware resource of a scanner controller 302 according to the program and the various parameters stored in the ROM 107 while using the RAM 106 as a work area. The various mechanisms included in the scanner unit 3 are thereby controlled. For example, the main controller 101 controls the hardware resources in the scanner controller 302 to convey the originals mounted on the ADF by the user through a conveyance control unit 304 and read the originals with a sensor 305. Then, the scanner controller 302 saves the read image data in a RAM 303. Note that the print controller 202 converts the obtained image data to the print data as described above and this allows the print head 8 to execute the printing operation based on the image data read in the scanner controller 302.

Figure 3:
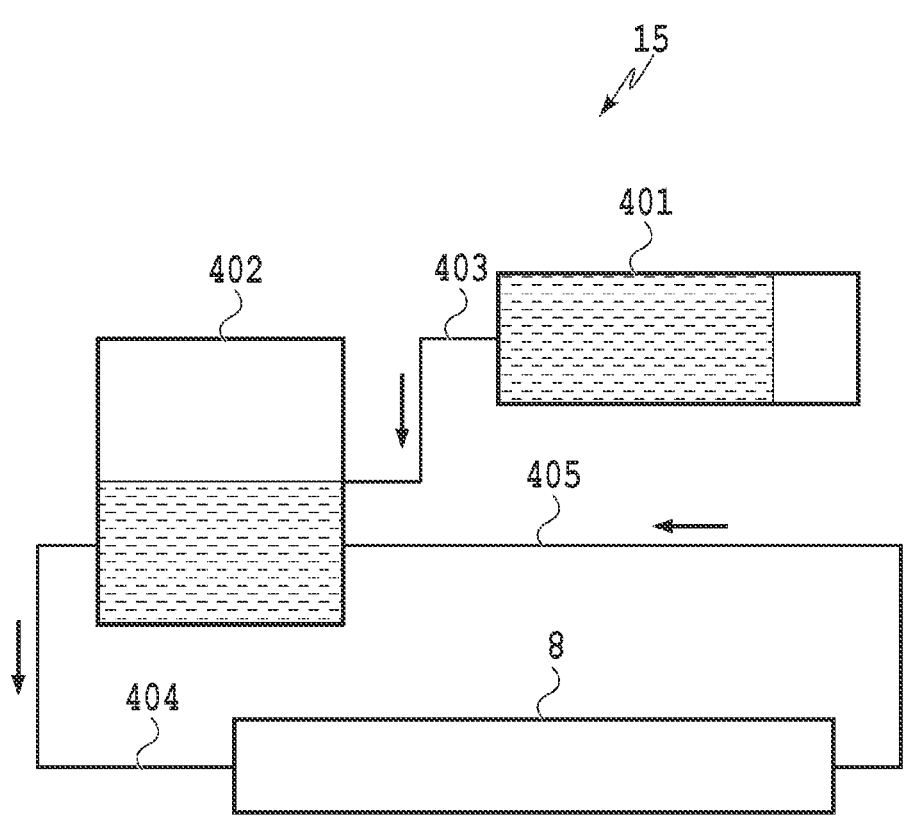
FIG. 3 is a diagram schematically illustrating a configuration of an ink supply unit.

FIG. 3 is a diagram schematically illustrating a configuration of the ink supply unit 15 (see FIG. 1) in the printing apparatus 1. The ink supply unit 15 supplies the ink supplied from a main tank 401 attached to the ink tank unit 14 to the print head 8 while causing the ink to circulate at appropriate pressure. Although the configuration for an ink of one color is illustrated in FIG. 3, the same configuration is provided for each ink color in the printing apparatus 1.

The ink supply unit 15 includes a sub tank 402, a connection channel 403, a supply channel 404, and a collecting channel 405. The sub tank 402 is a tank that temporarily receives the ink to be supplied to the print head 8 and is connected to the print head 8 via the supply channel 404 and the collecting channel 405. The ink circulates from the sub tank 402 to the supply channel 404, to the print head 8, to the collecting channel 405 and returns to the sub tank 402. During the aforementioned circulation, the print head 8 ejects the ink according to the print data.

Performing such ink circulation control allows fresh ink to be stably supplied to the print head 8. As a result, it is possible to stabilize the ejection operation of the print head 8 and maintain quality of an outputted image at a high level.

The amount of received ink in the sub tank 402 gradually decreases with the printing operation. Accordingly, in a case where the amount of received ink in the sub tank 402 reaches or falls below a predetermined value, the print controller 202 (see FIG. 2) drives a not-illustrated pump at predetermined timing and reduces the pressure inside the sub tank 402. The sub tank 402 is thereby replenished with the ink from the main tank 401 connected to the sub tank 402 by the connection channel 403. The main tank 401 whose ink is consumed is removed from the ink tank unit 14 and the user can replace it with a new main tank 401. The print controller 202 performs such sub tank replenishment processing as a preparation stage of the printing apparatus 1 before the reception of the print job, as appropriate.

In the embodiment, the main controller 101 controls the aforementioned ink circulation and the printing operation by the print head 8 based on a conclusion state of a usage agreement of the printing apparatus 1.

<Outline of Usage Agreement>

The printing apparatus 1 of the embodiment can receive a specific service under a subscription agreement. Contents of the subscription agreement are not limited to particular contents. In the embodiment, the subscription agreement is assumed to be an agreement in which a main tank being a target of service (hereinafter, referred to as service target tank) is available for printing of up to a predetermined number of sheets by paying a monthly flat-rate charge. The service target tank is a main tank allowed to be used only in a case where the subscription agreement is concluded. Moreover, the service target tank is the same type of tank as the general main tank (hereinafter, referred to as general tank) and both tanks can be attached to the ink tank unit 14 of the printing apparatus 1. Note that a tank memory is attached to each of the main tanks and stores information such as information indicating whether the tank is the service target tank or the general tank and information on the color of the contained ink. Accordingly, the main controller 101 can determine whether the attached tank is the general tank or the service target tank by reading the information stored in the tank memory.

Figure 4A:
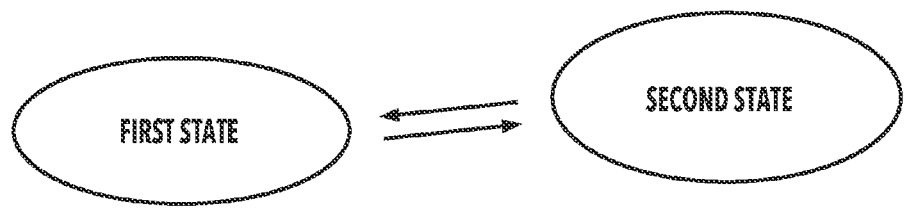
FIGS. 4A and 4B illustrate states of the printing apparatus and a concept view of an information processing system.

FIG. 4A illustrates a state of the printing apparatus 1 based on the subscription agreement. In the embodiment, in a case where the subscription agreement is not concluded, the printing apparatus 1 is assumed to be in a first state in which the service is unavailable. Meanwhile, in a case where the subscription agreement is concluded, the printing apparatus 1 is assumed to be in a second state in which the service is available. At the moment where the printing apparatus 1 is shipped, the printing apparatus 1 is in the first state. Then, if the user concludes the subscription agreement, the state of the printing apparatus 1 is switched from the first state to the second state. The user can switch the printing apparatus 1 between the first state and the second state by concluding or cancelling the subscription agreement. Moreover, in a case where the user has not canceled the subscription agreement but a state in which the printing apparatus 1 cannot communicate with the servers continues for a predetermined period, a service provider cannot manage the usage state of the printing apparatus 1. Accordingly, the printing apparatus 1 of the embodiment is switched from the second state to the first state. The aforementioned state of the printing apparatus 1 is required to be appropriately set to allow the user to receive an appropriate service matching the agreement.

Figure 4B:
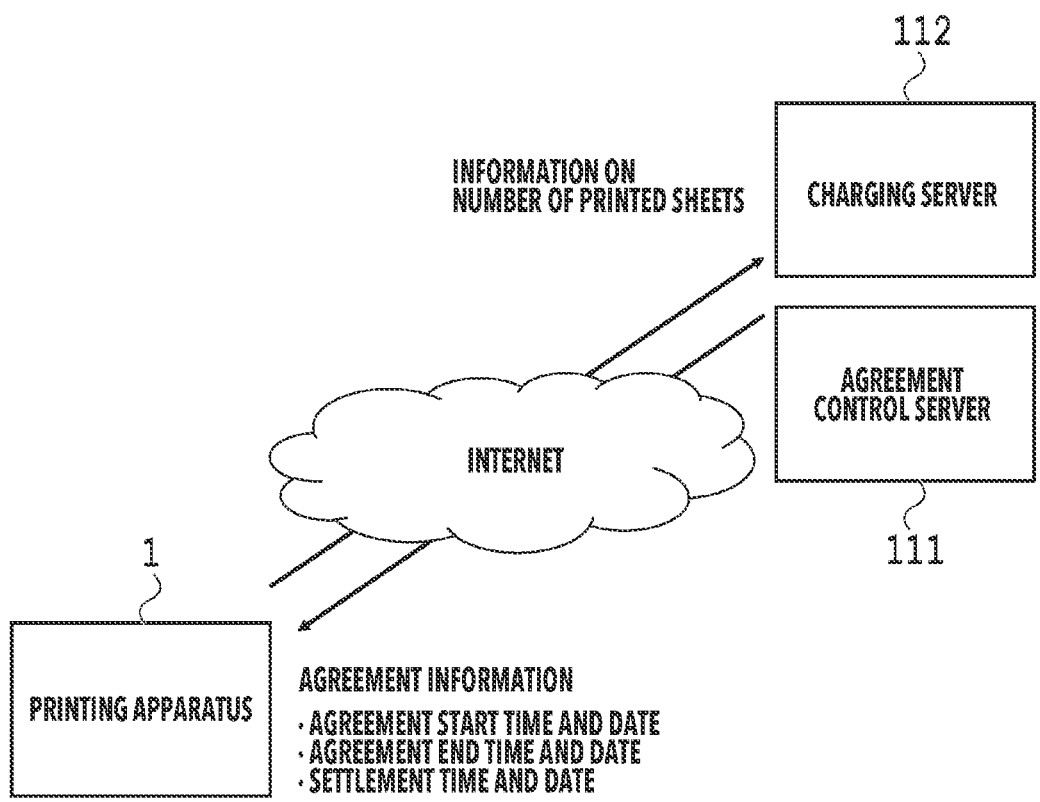

FIG. 4B is a diagram illustrating an information processing system of the embodiment. In the embodiment, the agreement control server 111 and the charging server 112 connected to the printing apparatus 1 via the Internet manage the subscription agreement of the printing apparatus 1. The main controller 101 of the printing apparatus 1 periodically receives agreement information of the printing apparatus 1 from the agreement control server 111 and saves the agreement information in the non-volatile memory 115 (see FIG. 2). The received agreement information includes an agreement start time and date, an agreement end time and date, a monthly settlement date, and the like. Moreover, the main controller 101 can obtain a current time and date from the agreement control server 111 as necessary. The format of the current time and date is in compliant with ISO8601 (yyyy-MM-ddTHH:mm:ssZ). Employing the mode in which the current time and date is obtained from the agreement control server 111 allows time to be uniformly managed among all printing apparatuses 1 connected to the server. Although the expressions of "agreement start time and date", "agreement end time and date", and "settlement time and date" are used in the description, in the embodiment, these pieces of information do not have to necessary include information on time. In other words, these pieces of information may include information only on year, month, and date.

Meanwhile, the main controller 101 of the printing apparatus 1 periodically sends information on the number of sheets printed by the printing apparatus 1 and information on a remaining inks mount to the charging server 112. In this case, the information on the number of printed sheets includes the number of sheets printed in the color mode and the number of sheets printed in the monochrome mode in a predetermined period. The charging server 112 compares the number of printed sheets with the contents of agreement and performs charging processing depending on the agreement. For example, in a case where the number of printed sheets is equal to or less than a defined value in a state where the subscription agreement concluded, the charging server 112 charges the monthly flat-rate charge. In a case where the number of printed sheets exceeds the defined value, the charging server 112 charges an excess charge in addition to the flat-rate charge. Moreover, the charging server 112 infers whether delivery of the main tank to be described later is necessary or not based on the received information on the remaining ink amount.

Figure 5:
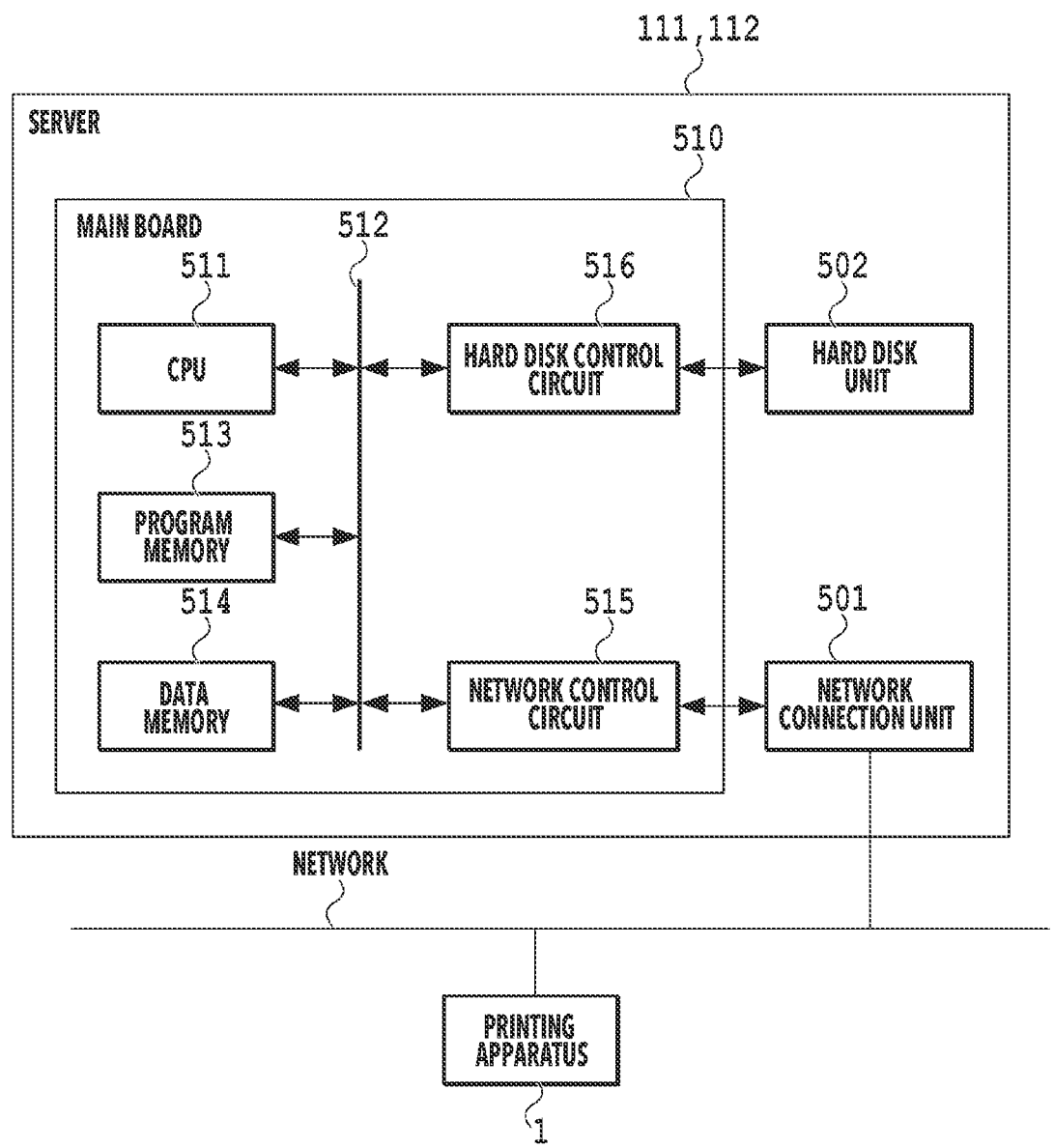
FIG. 5 is a block diagram illustrating a configuration of a server.

FIG. 5 is a block diagram illustrating a configuration of the agreement control server 111 and the charging server 112. In FIG. 5, the same hardware configuration is assumed to be used for the agreement control server 111 and the charging server 112. Hereinafter, the agreement control server 111 and the charging server 112 are simply referred to as servers 111, 112 for the sake of convenience. Each of the servers 111, 112 includes a network connection unit 501, a hard disk unit 502, and a main board 510 that controls the entire apparatus. The main board 510 includes a CPU 511, an internal bus 512, a program memory 513, a data memory 514, a network control circuit 515, and a hard disk control circuit 516. Although the system example in which the agreement control server 111 performs the agreement management and the charging server 112 performs the charging management and the delivery management is described in the example, the embodiment is not limited to this system example. For example, one server may perform functions of managing all of agreement, charging, and delivery. Alternatively, three or more servers may perform the functions of managing agreement, charging, and delivery in cooperation. A configuration including one or more servers is referred to as a server system and, in the embodiment, the server system is assumed to manage agreement, charging, and delivery.

The CPU 511 in a microprocessor form arranged in the main board 510 operates according to contents of the data memory 514 and a control program stored in the program memory 513 connected to the CPU 511 via the internal bus 512. The CPU 511 connects to the Internet by controlling the network connection unit 501 via the network control circuit 515 and communicates with one or more printing apparatuses 1 and other servers. The CPU 511 can read data from and write data to the hard disk unit 502 connected to the CPU 511 via the hard disk control circuit 516. An operating system and control software of the server 111, 112 used by being loaded onto the program memory 513 are stored in the hard disk unit 502 in addition to various pieces of data.

In the case of the agreement control server 111, the agreement start time and date and the agreement end time and date of the printing apparatus 1 and the like are stored in the data memory 514 in a rewritable manner. In a case where the server 111 receives a request for the agreement information from the printing apparatus 1, the CPU 511 sends the printing apparatus 1 the information on the agreement start time and date and the agreement end time and date saved in the data memory 514, via the network connection unit 501. In the case of the charging server 112, the number of sheets printed by the printing apparatus 1 and the like are saved in the data memory 514 in a rewritable manner. In a case where the charging server 112 receives the information on the number of printed sheets from the printing apparatus 1, the CPU 511 saves the information received via the network connection unit 501 in the data memory 514.

Figure 6A:
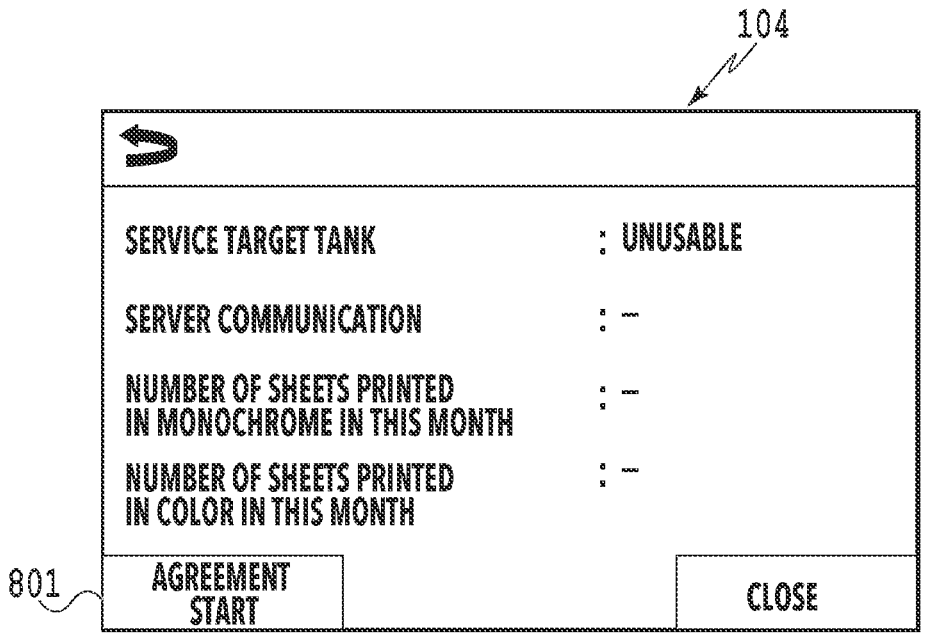
FIGS. 6A and 6B are views illustrating a display screen of an operation panel.
Figure 6B:
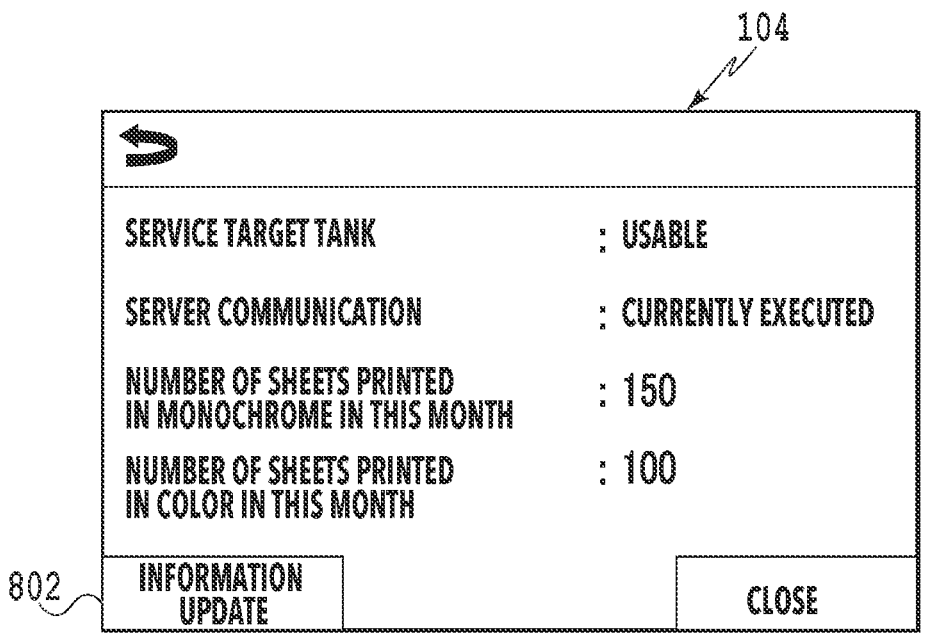

FIGS. 6A and 6B are views illustrating a display screen of the operation panel 104 used by the user to conclude the subscription agreement and check the agreement state in the printing apparatus 1. FIG. 6A illustrates the display screen in a case where the printing apparatus 1 is in the first state and FIG. 6B illustrates the display screen in a case where the printing apparatus 1 is in the second state.

In a case where the printing apparatus 1 is in the first state, that is the subscription agreement is not concluded, as illustrated in FIG. 6A, notices such as a notice indicating that the service target tank cannot be used and a notice indicating that communication with the servers is not performed are displayed on the operation panel 104. In a case where the user presses an agreement start button 801 in a lower left portion of the screen, the printing apparatus 1 starts obtaining the agreement information from the agreement control server 111. Note that, in this case, a separate subscription agreement is assumed to be concluded between the user and the service provider (sales company of the printer) in advance. Moreover, the agreement information (agreement start time and date, agreement end time and date, and the like) is assumed to be stored in the data memory 514 (see FIG. 5) of the agreement control server 111 based on the agreement contents. Thus, the printing apparatus 1 can obtain the agreement information by the pressing of the agreement start button 801. In other words, the agreement start button 801 in this case can be also referred to as a communication start button.

Note that the method of agreement is not limited to the aforementioned method. For example, the subscription agreement may be concluded by an operation on the printing apparatus 1 even if there is no agreement concluded between the user and the service provider in advance. In this case, for example, pressing of the agreement start button 801 by the user causes the display screen to switch to a screen for agreement and the user can conclude the subscription agreement through the operation panel 104. The conclusion information of the subscription agreement is sent to the agreement control server 111 and the agreement control server 111 saves the agreement start time and date, the agreement end time and date, and the like in the data memory 514 (see FIG. 5) according to the received information.

As described above, the agreement control server 111 sends the printing apparatus 1 the agreement start time and date and the agreement end time and date saved in the data memory 514 as necessary. The printing apparatus 1 is thereby switched from the first state to the second state. Note that the agreement end date is not necessarily decided depending on the user. In a case where the agreement end date is undecided, use of the following modes are conceivable: a mode in which the information on the agreement end date is not set; and a mode in which a time and date so far in the future that the agreement end date can be assumed to be substantially undecided is set as "temporal agreement end date". In the latter mode, for example, a date and time 100 years later from the current time and date is inputted as the "temporal agreement end date" and the agreement end date is thereby assumed be substantially undecided. Accordingly, in a case where the agreement end date is undecided, in the former mode, information indicating that the agreement end date is undecided is stored in the memory 514 and, in the latter mode, a time and date in far future is stored in memory 514. Since the setting of the agreement end date, though a formality, is performed in the latter mode, this mode is preferable in terms of security.

In a case where the printing apparatus 1 is in the second state, that is the subscription agreement is concluded, a screen illustrated in FIG. 6B is displayed on the operation panel 104. Specifically, there are displayed a notice indicating that the service target tank can be used, a notice indicating that the communication with the servers is performed, the number of sheets printed in the monochrome mode in this month, and the number of sheets printed in the color mode in this month. Pressing of an information update button 802 in a lower left portion of the screen by the user causes the main controller 101 to access the agreement control server 111 to obtain the latest information and update the display contents of the operation panel 104 based on the obtained information.

FIGS. 7A and 7B are diagrams illustrating an example of usage conditions of the main tank. FIG. 7A illustrates a usage condition in which the general tank and the service target tank are usable in the state where the subscription agreement is concluded and only the general tank is usable in the state where the subscription agreement is not concluded. Meanwhile, FIG. 7B illustrates a usage condition in which only the service target tank is usable in the state where the subscription agreement is concluded and only the general tank is usable in the state where the subscription agreement is not concluded. As described above, the main controller 101 of the embodiment determines whether to allow the use of each of the attached main tanks based on whether the printing apparatus 1 is in the first state or the second state and whether the main tank is the general tank or the service target tank. Then, if the main controller 101 determines that the attached main tank is not usable, the main controller 101 adds restrictions to the ink circulation, the printing operation, and the like described in FIG. 3. Although either of the usage condition of FIG. 7A or the usage condition of FIG. 7B can be employed in the embodiment, description is given below of an example in which the usage condition of FIG. 7A is employed.

For example, in a case where the ink amount in the sub tank 402 described in FIG. 4 reaches or falls below the predetermined value, the main controller 101 causes the print controller 202 to replenish the sub tank 402 with the ink from the main tank 401 in a case where the main tank 401 is usable. However, in a case where the main tank 401 is not usable, the main controller 101 does not cause the print controller 202 to replenish the sub tank 402 with the ink from the main tank 401. Moreover, in a case where the printing apparatus 1 receives the print job, the main controller 101 transmits the received print job to the print engine unit 200 in a case where the main tank 401 is usable. However, in a case where the main tank 401 is not usable, the main controller 101 does not send the received print job to the print engine unit 200.

<State Setting Sequence of Printing Apparatus>

The state of the printing apparatus 1 needs to be appropriately set to appropriately provide the service based on the subscription agreement. Accordingly, in the embodiment, in the case where the printing apparatus 1 is in the second state, the main controller 101 periodically accesses the agreement control server 111 and obtains the agreement information (see FIG. 4B).

Figure 8A:
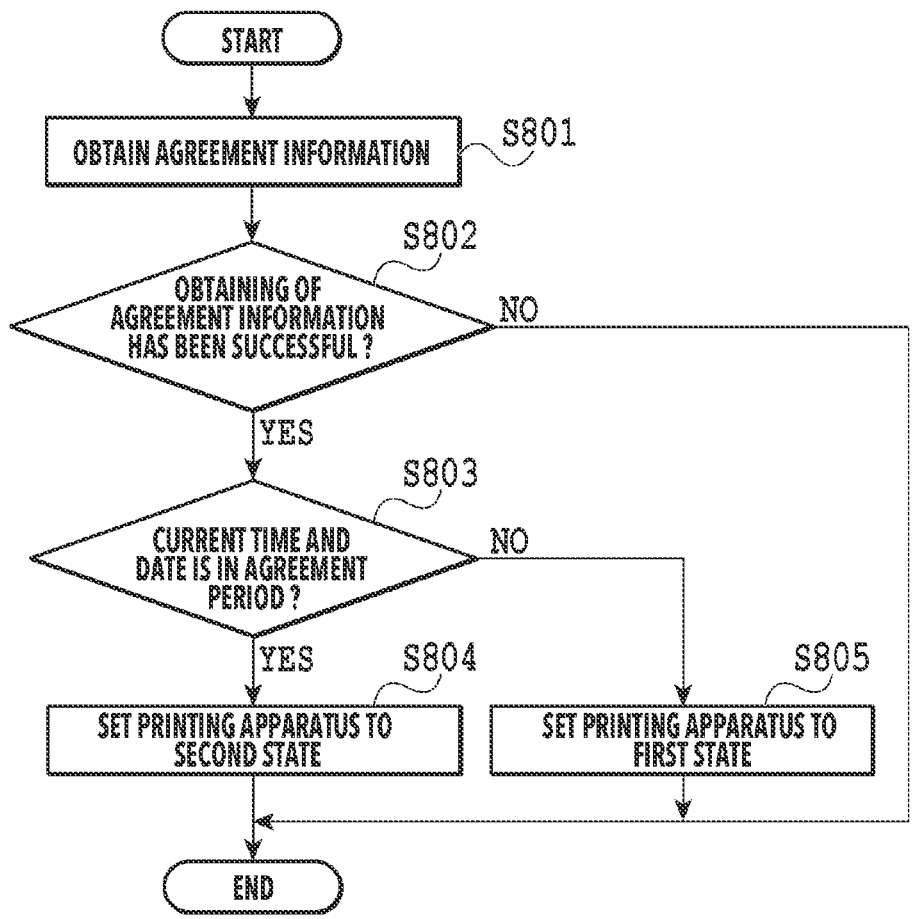
FIGS. 8A and 8B are flowcharts for explaining state setting sequences.

FIG. 8A is a flowchart for explaining a state setting sequence performed by the main controller 101. The main controller 101 periodically and repeatedly performs this processing according to the program stored in the ROM 107 while using the RAM 106 as the work area in a case where the printing apparatus 1 is in the second state. Moreover, the main controller 101 executes this processing also in a case where a certain operation relating to the subscription agreement is performed on the operation panel 104.

In a case where this processing is started, in S801, the main controller 101 first obtains the agreement information from the agreement control server 111. Specifically, the main controller 101 accesses the agreement control server 111 and obtains the agreement start time and date and the agreement end time and date saved in the agreement control server 111 as well as the current time and date.

In S802, the main controller 101 determines whether the obtaining of the agreement information in S801 has been successful or has failed. In a case where the main controller 101 determines that the obtaining of the agreement information has failed, this processing is terminated. Meanwhile, in a case where the main controller 101 determines that the obtaining of the agreement information has been successful, the main controller 101 proceeds to S803 and compares the current time and date with the agreement start time and date and the agreement end time and date obtained in S801 to determine whether the current time and date is included in the agreement period between the agreement start time and date and the agreement end time and date. Then, in a case where the current time and date is included in the period, the main controller 101 proceeds to S804 and sets the printing apparatus 1 to the second state. Specifically, the main controller 101 writes information indicating that the printing apparatus 1 is in the second state, in a state information region of the non-volatile memory 115.

Meanwhile, in the case where the current time and date is not included in the agreement period between the agreement start time and date and the agreement end time and date, the main controller 101 proceeds to S805 and sets the printing apparatus 1 to the first state. Specifically, the main controller 101 writes information indicating that the printing apparatus 1 is in the first state, in the state information region of the non-volatile memory 115. Then, this processing is terminated.

Figure 8B:
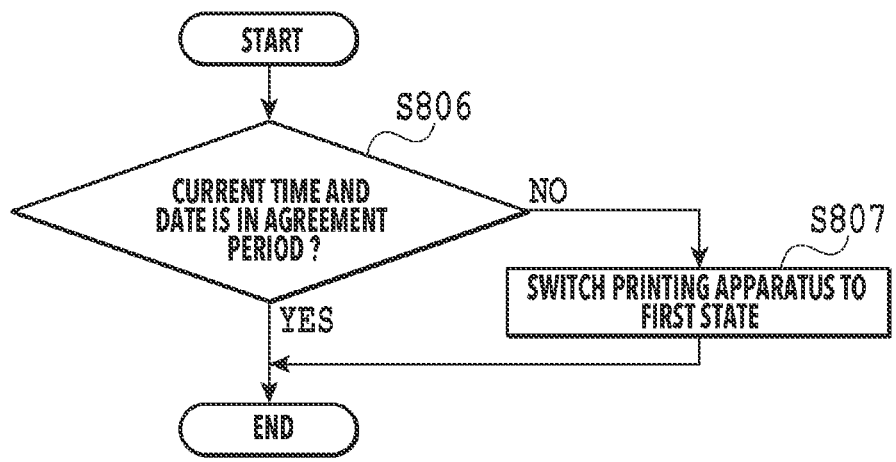

FIG. 8B is a flowchart for explaining a state setting sequence periodically and repeatedly performed inside the printing apparatus 1 in the case where the priming apparatus 1 is in the second state. This processing is performed only by the internal configuration of the printing apparatus 1, separate from the state setting sequence in FIG. 8A performed via the server and is repeatedly performed at a shorter cycle than that of the state setting sequence in FIG. 8A.

In the case where this processing is started, in S806, the main controller 101 determines whether the current time and date managed by the printing apparatus 1 is included in the period between the agreement start time and date and the agreement end time and date currently stored in the non-volatile memory 115. Then, in a case where the current time and date is included in the period between the agreement start time and date and the agreement end time and date, the main controller 101 terminates this processing while maintaining the printing apparatus 1 in the second state.

Meanwhile, in a case where the main controller 101 determines that the current time and date is not included in the period between the agreement start time and date and the agreement end time and date in S806, the main controller 101 proceeds to S807 and switches the printing apparatus 1 from the second state to the first state. Then, this processing is terminated.

As described above, according to the embodiment, it is possible to appropriately set the state of the printing apparatus 1 based on the agreement start time and date, the agreement end time and date, and the current time and date.

<Restarting Sequence of Printing Apparatus>

The printing apparatus 1 needs to perform the state setting sequence described in FIG. 8A at a timing of power-on or a timing of recovery from a power-saving mode to recheck the agreement state. Moreover, since there is a concern that the printing operation has not been performed for a long period at the aforementioned timings, the printing apparatus needs to perform a specific start-up sequence as a preliminary preparation for normally performing the printing operation. Both of these sequences are necessary before the start of the priming operation and require a certain amount of time. Meanwhile, it is preferable for the user that waiting time from an instruction of a print job is as short as possible.

In view of this, the printing apparatus 1 of the embodiment executes a specific restarting sequence for the preparation of the printing operation at the timing of the power-on or the timing of recovery from the power-saving mode. Note that, in the following description, the timing at which the power is turned on again after being once turned off or the timing at which the printing apparatus 1 recovers from the power saving mode is referred to as reactivation timing of the printing apparatus 1.

Figure 9:
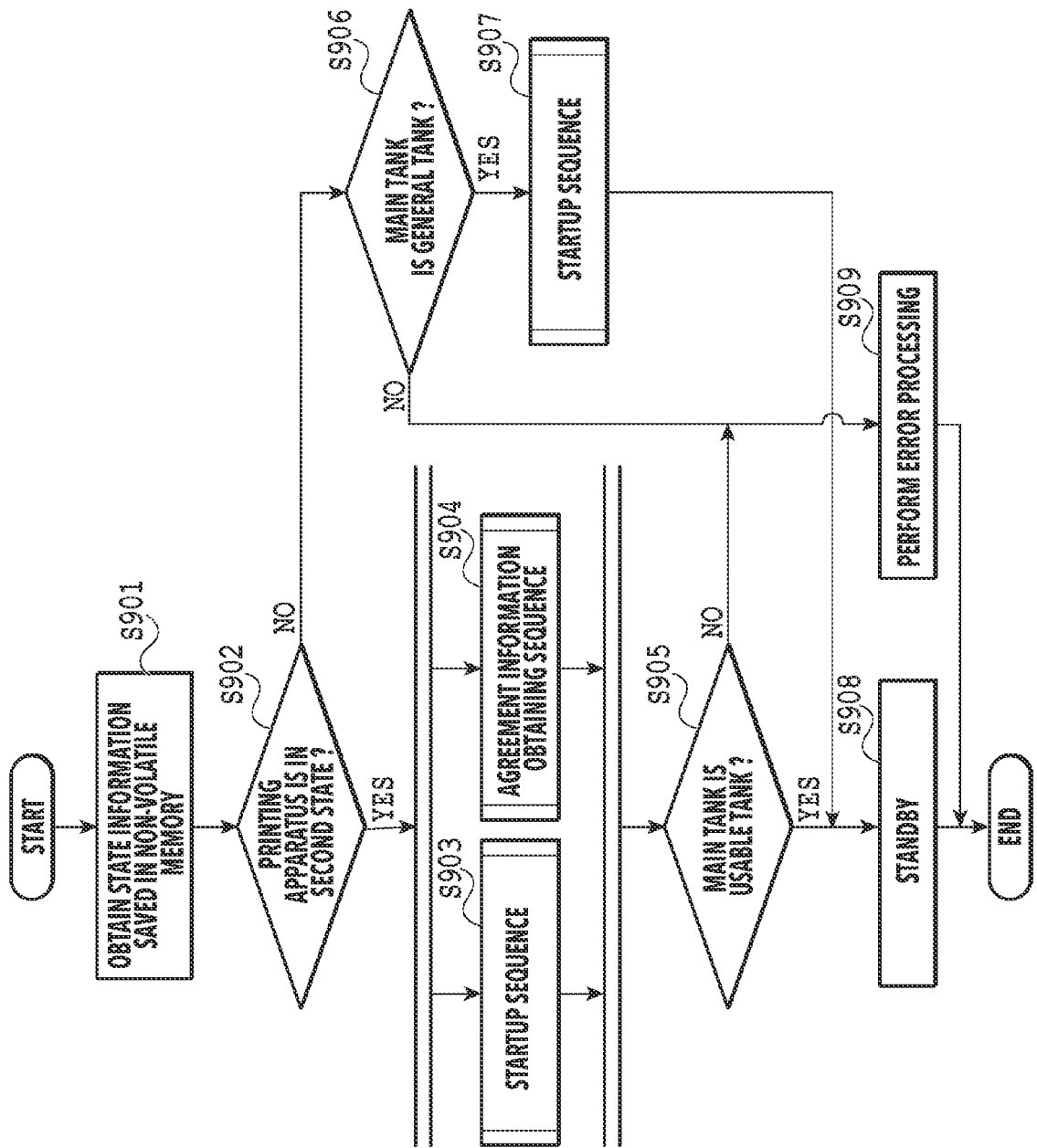
FIG. 9 is a flowchart for explaining a restarting sequence.

FIG. 9 is a flowchart for explaining the restarting sequence. This processing is processing executed by the main controller 101 in the case where the printing apparatus is reactivated.

In the case where this processing is started, in S901, the main controller 101 first reads the state information saved in the non-volatile memory 115. Specifically, the main controller 101 obtains information indicating whether the printing apparatus 1 is in the first state or the second state. The information saved at this moment is information that has been saved before the printing apparatus 1 is turned off or enters the power-saving mode.

In S902, the main controller 101 determines whether the printing apparatus 1 is in the second state based on the state information obtained in S901. In a case where the printing apparatus 1 is in the second state, the main controller 101 starts a startup sequence in S903 and an agreement information obtaining sequence in S904 and performs these sequences in parallel.

In this case, the startup sequence performed in S903 is a sequence of preparation for starting the printing operation by the printing apparatus 1. Specifically, the startup sequence includes processing of detecting the amount of ink received in the sub tank 402 and supplying the ink from the attached main tank 401 to the sub tank 402 in the case where the amount of ink is the predetermined value or less as described by using FIG. 3. Moreover, the startup sequence includes processing of starting the circulation of the ink between the print head 8 and the sub tank 402 and maintenance processing such as sucking processing and wiping processing of the print head 8.

Meanwhile, the agreement information obtaining sequence performed in S904 is substantially the same as the state setting sequence already described in the flowchart of FIG. 8A. Performing the state setting sequence of FIG. 8A at this timing causes the main controller 101 to recheck the state of the printing apparatus 1 and update the state information in the non-volatile memory 115.

In the case where both of the startup sequence in S903 and the agreement information obtaining sequence in S904 are completed, the main controller 101 proceeds to S905. Then, the main controller 101 determines whether the main tank 401 currently attached to the ink tank unit 14 is usable based on the state information of the printing apparatus 1 updated in the agreement information obtaining sequence in S904 and the information saved in the tank memory of the currently-attached main tank. This determination can be performed according to the usage conditions in FIGS. 7A and 7B described above. Then, in a case where the main controller 101 determines that the currently-attached main tank is usable, the main controller 101 proceeds to S908 and sets the printing apparatus 1 to the standby state. Note that the standby state means a state in which the printing operation can be immediately started upon input of the print job.

Meanwhile, in a case where the main controller 101 determines that the currently attached main tank is unusable in S905, the main controller 101 proceeds to S909 and performs error processing. Specifically, the main controller 101 restricts the replenishment of the sub tank 402 with the ink from the main tank 401, the maintenance processing on the print head 8, and the sending of the print job to the print engine unit 200. Then, the main controller 101 performs an error display on the operation panel 104 and notifies the user that an unsuitable main tank 401 is attached.

In a case where the main controller 101 determines that the printing apparatus 1 is in the first state in S902, the main controller 101 proceeds to S906 and determines whether the currently-attached main tank is the general tank. In a case where the main controller 101 determines that the currently-attached main tank is the general tank, the main controller 101 executes the startup sequence in S907 and then proceeds to S908 to set the printing apparatus 1 to the standby state. The contents of the startup sequence performed in S907 are the same as the contents of the startup sequence performed in S903.

Meanwhile, in a case where the main controller 101 determines that the currently-attached main tank is not the general tank in S906, the main controller 101 proceeds to S909 and performs the error processing. Then, this processing is terminated.

According to the embodiment as described above, in the case where the printing apparatus 1 is reactivated, the main controller 101 performs preparation for starting the printing operation by performing the startup sequence while performing the agreement information obtaining sequence, if the state stored in the non-volatile memory 115 is the second state. Then, after formal agreement information is obtained in the agreement information obtaining sequence, the main controller 101 rechecks whether the currently-attached main tank is usable, based on the formal agreement information.

For example, assume a case where the printing apparatus 1 for which the subscription agreement is concluded and which has been in the power saving mode is reactivated by the input of the print job. In this case, if the main controller 101 determines that the main tank is usable based on the formal agreement information obtained in the agreement information obtaining sequence in S904, the printing operation can be started immediately after the completion of the startup sequence in S903, in other words, the waiting time of the user can be suppressed to a minimum.

Meanwhile, if the main controller 101 determines that the main tank is unusable based on the agreement information obtained in the agreement information obtaining sequence, a certain amount of ink is consumed in the startup sequence. However, since the printing operation and the maintenance operation thereafter are restricted by the error processing in S909, further consumption of the ink can be suppressed.

Moreover, in the case where no subscription agreement is concluded and the general tank is mounted, the printing operation can be immediately started after execution of only the startup sequence in S907.

Specifically, according to the embodiment, the time from the reactivation of the printing apparatus 1 to the setting of the printing apparatus 1 to the standby state, that is the waiting time of the user can be reduced by performing the agreement information obtaining sequence simultaneously in parallel with the startup sequence that requires a relatively long period of time.

Note that, in FIG. 9, description is given of the contents in which the determination processing of S905 is performed after the completion of both of the startup sequence in S903 and the agreement information obtaining sequence in S904. However, the determination processing of S905 may be a sequence that is repeatedly performed independent of the restarting sequence in FIG. 9. Then, if the main controller 101 determines that the currently-attached main tank is unusable in this determination processing, the main controller 101 may cut into the restarting sequence of FIG. 9 and proceed to the error processing in S909. This enables cancelation of the startup sequence in S903 even in the state where the startup sequence is performed and the ink is circulated between the sub tank 402 and the print head 8 described in FIG. 3, and the consumption of the ink against the agreement can be further suppressed.

Other Embodiments

In the aforementioned embodiment, as illustrated in FIG. 9, the startup sequence and the agreement information obtaining sequence are performed in parallel and the processing of determining whether the currently-attached main tank is usable is performed at a point where both sequences are completed. However, in the case where the print job is received at a point where the startup sequence is completed, the printing operation may be started at this point. In this case, the configuration may be such that, if the main controller 101 determines that the attached main tank is unusable in the subsequent determination processing (S905), an error is generated at the timing of this determination and the printing operation is aborted with the currently-printed page being the last page. In this example, a certain amount of ink and sheets are consumed by the started print operation as well as the startup sequence. However, the time from the reception of the prim job to the output of the printed sheet can be further reduced from that in the aforementioned embodiment.

Description is given above of the mode in which the agreement server 111 and the charging server 112 have independent functions and the printing apparatus 1 communicates with both servers. However, the agreement server 111 and the charging server 112 may be one server having the functions of both servers. Alternatively, a server system including one or more servers may perform the functions of both servers.

Moreover, description is given above of the case where the ink-jet printing apparatus 1 is used as the information processing apparatus. However, the information processing apparatus may be an image printing apparatus that uses a coloring material other than the ink. For example, in a case where the subscription agreement is concluded with an image printing apparatus that uses toner as the color material being the information processing apparatus, a specific toner cartridge (container containing the toner) may be made usable.

Moreover, the information processing apparatus may be an apparatus other than the printing apparatus as long as the information processing apparatus is capable of commutating with the server saving the predetermined agreement information. In this case, the contents of the service based on the subscription agreement are not limited to particular contents and the information processing apparatus only needs to send the charging server a processing amount of processing unique to the information processing apparatus instead of the print processing in the aforementioned embodiment. Any apparatus can function as the information processing apparatus of the present invention as long as the apparatus is an information processing apparatus capable of communicating with the server saving the predetermined agreement information and is an apparatus capable of providing a certain service depending on the agreement conclusion state.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-061430 filed Mar. 30, 2020, which is hereby incorporated by reference wherein in its entirety.

What is claimed is:

1. A printing apparatus capable of printing based on a printing service provided by concluding a predetermined agreement, comprising:
   a printing unit configured to print on a print sheet;
   at least one memory storing a program; and
   at least one processor that executes the program to:
   receive, from a server that provides the printing service, information related to the predetermined agreement;
   display a first screen notifying that a communication for the predetermined agreement with the server is impossible, wherein the first screen includes an object for receiving a user operation to start the communication with the server and is displayed when the communication with the server is impossible and a predetermined condition is satisfied; and
   restrict, based on an agreement period identified by the information related to the predetermined agreement and a type of a consumable attached to the printing apparatus, a printing operation.

2. The printing apparatus according to claim 1, wherein information related to the predetermined agreement is further received from the server in response to the user operation to the object in the first screen.

3. The printing apparatus according to claim 1, wherein information on the number of sheets printed by the printing unit is sent to the outside.

4. The printing apparatus according to claim 1, wherein information related to the predetermined agreement is received from the server periodically.

5. The printing apparatus according to claim 4, wherein the information related to the predetermined agreement from the server includes information on agreement end time and date.

6. The printing apparatus according to claim 4 wherein the information related to the predetermined agreement is stored in a storage unit, and
   the information related to the predetermined agreement from the server is information indicating whether the printing apparatus is in a first state in which the printing service is unavailable because the predetermined agreement is unconcluded, or the printing apparatus is in a second state in which the printing service is available because the predetermined agreement is concluded.

7. The printing apparatus according to claim 6, wherein, in a case where the information stored in the storage unit indicates the second state and when the printing apparatus is turned on or recovers from a power-saving mode, a communication with the server to obtain, from the server, the information related to the predetermined agreement indicating an agreement state of the predetermined agreement and to update the information stored in the storage unit starts before a preparation of the printing operation is completed.

8. The printing apparatus according to claim 1, wherein the printing unit performs the printing operation by ejecting ink to the print sheet.

9. A control method of a printing apparatus which can print based on a printing service provided by concluding a predetermined agreement, the method comprising:
   performing a printing operation on a print sheet by using a printing unit;
   receiving from a server that provides the printing service, information related to the predetermined agreement;
   displaying a first screen notifying that a communication for the predetermined agreement with the server is impossible, wherein the first screen includes an object for receiving a user operation to start the communication with the server and is displayed when the communication with the server is impossible and a predetermined condition is satisfied; and
   restricting, based on an agreement period identified by the information related to the predetermined agreement and a type of a consumable attached to the printing apparatus, a printing operation.

10. A system including a server for managing a predetermined agreement and a printing apparatus capable of printing based on a printing service provided by concluding the predetermined agreement, the printing apparatus comprising:
    a printing unit configured to print on a print sheet;
    at least one memory storing a program; and
    at least one processor that executes the program to:
    receive, from a server that provides the printing service, information related to the predetermined agreement;
    display a first screen notifying that a communication for the predetermined agreement with the server is impossible, wherein the first screen includes an object for receiving a user operation to start the communication with the server and is displayed when the communication with the server is impossible and a predetermined condition is satisfied; and
    restrict, based on an agreement period identified by the information related to the predetermined agreement and a type of a consumable attached to the printing apparatus, a printing operation.

11. The printing apparatus according to claim 1, wherein the predetermined condition is that a predetermined period has passed since the communication with the server became impossible.

* * * * *